United States Patent
Goda (10) Patent No.: US 11,205,002 B2
(45) Date of Patent: Dec. 21, 2021

(54) INFORMATION PROCESSING APPARATUS AND METHOD FOR CONTROLLING INFORMATION PROCESSING APPARATUS

(71) Applicant: CANON KABUSHIKI KAISHA, Tokyo (JP)

(72) Inventor: Keigo Goda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 16/029,437

(22) Filed: Jul. 6, 2018

(65) Prior Publication Data

US 2019/0026470 A1    Jan. 24, 2019

(30) Foreign Application Priority Data

Jul. 18, 2017  (JP) .................................. 2017-139143

(51) Int. Cl.
- *G06F 21/57* (2013.01)
- *G06F 1/3287* (2019.01)
- *G06F 1/3234* (2019.01)
- *G06F 1/3203* (2019.01)

(52) U.S. Cl.
CPC .......... *G06F 21/572* (2013.01); *G06F 1/3203* (2013.01); *G06F 1/3243* (2013.01); *G06F 1/3275* (2013.01); *G06F 1/3284* (2013.01); *G06F 1/3287* (2013.01); *G06F 2221/033* (2013.01)

(58) Field of Classification Search
CPC .................................................... G06F 21/572

USPC ............................................................. 726/22
See application file for complete search history.

(56) References Cited

U.S. PATENT DOCUMENTS

| | | | | |
|---|---|---|---|---|
| 6,901,298 B1* | 5/2005 | Govindaraj | .......... | G05B 19/058 700/21 |
| 8,533,833 B2* | 9/2013 | Gaist | ................. | G06F 21/74 726/24 |
| 8,767,229 B2* | 7/2014 | Murray | ................. | G06F 1/3284 358/1.13 |
| 2005/0195975 A1* | 9/2005 | Kawakita | ............. | H04L 9/0825 380/30 |
| 2009/0207423 A1 | 8/2009 | Shimizu | | |
| 2009/0282278 A1* | 11/2009 | Satoh | ................. | G06F 1/3209 713/321 |
| 2009/0313487 A1* | 12/2009 | Lee | ................. | G06F 1/3246 713/300 |
| 2009/0323120 A1* | 12/2009 | Yamanaka | ......... | H04N 1/00885 358/1.16 |

(Continued)

FOREIGN PATENT DOCUMENTS

JP  2009223866 A  10/2009
JP  2012-078952 A  4/2012

(Continued)

*Primary Examiner* — Dant B Shaifer Harriman
(74) *Attorney, Agent, or Firm* — Canon U.S.A., Inc. IP Division (57) ABSTRACT

An information processing apparatus performs control to make a transition to a power-saving state, confirms whether a program stored in the information processing apparatus is authentic, in association with the transition to the power-saving state, and stores the program confirmed to be authentic in a volatile memory during the power-saving state.

11 Claims, 9 Drawing Sheets (56) References Cited

U.S. PATENT DOCUMENTS

| | | | |
|---|---|---|---|
| 2012/0221955 A1* | 8/2012 | Raleigh | H04L 12/1485 |
| | | | 715/736 |
| 2013/0070363 A1* | 3/2013 | Bennett | G11B 19/2081 |
| | | | 360/73.03 |
| 2013/0275654 A1* | 10/2013 | Chu | G06F 1/3275 |
| | | | 711/103 |
| 2014/0189162 A1* | 7/2014 | Wang | G06F 13/28 |
| | | | 710/5 |
| 2014/0229727 A1* | 8/2014 | Jun | G06F 1/3206 |
| | | | 713/2 |
| 2015/0124279 A1 | 5/2015 | Iizuka | |
| 2015/0168934 A1* | 6/2015 | Pai | G05B 19/0421 |
| | | | 700/20 |
| 2016/0048693 A1* | 2/2016 | Uner | G06F 21/604 |
| | | | 713/189 |
| 2016/0063254 A1* | 3/2016 | Jeansonne | G06F 21/606 |
| | | | 713/2 |
| 2016/0210050 A1* | 7/2016 | Hyun | G06F 3/0659 |
| 2017/0177870 A1 | 6/2017 | Hildebrand | |
| 2017/0270044 A1* | 9/2017 | Yang | G06F 3/0613 |
| 2019/0391760 A1* | 12/2019 | Miura | G06F 3/064 |

FOREIGN PATENT DOCUMENTS

| | | |
|---|---|---|
| JP | 6207792 B2 | 6/2013 |
| JP | 2015-152998 A | 8/2015 |
| JP | 2016-212545 A | 12/2016 |

\* cited by examiner

FIG.7A
MAIN CPU RETURNING FLOW

FIG.7B
SUB-CPU RETURNING FLOW

INFORMATION PROCESSING APPARATUS AND METHOD FOR CONTROLLING INFORMATION PROCESSING APPARATUS

BACKGROUND

Field

The present disclosure relates to an information processing apparatus and a method for controlling the information processing apparatus.

Description of the Related Art

Japanese Patent Application Laid-Open No. 2009-223866 discuses an information processing apparatus that includes a normal power mode and a power-saving mode that consumes less power than the normal power mode.

A nonvolatile program storage unit stores a first program executed by a first central processing unit (CPU) and a second program executed by a second CPU. The first CPU executes the first program loaded from the program storage unit to a first memory. The second CPU executes the second program loaded from the program storage unit to a volatile second memory.

In a case where a condition for transition to the power-saving mode is satisfied, the second program is transferred from the program storage unit to the first memory. In the case where the condition for transition to the power-saving mode is satisfied, power supply to the second memory is stopped. In a case where a condition for returning to the normal power mode is satisfied, the information processing apparatus resumes the supply of power to the second memory and makes a transition to the normal power mode. In the case where the condition for returning to the normal power mode is satisfied, the second program held by the first memory is transferred to the second memory. In the case where the condition for returning to the normal power mode is satisfied, the second CPU executes the second program if the second program has been transferred to the second memory.

The information processing apparatus discussed in Japanese Patent Application Laid-Open No. 2009-223866 can face the following issues. A malicious third party may remove the nonvolatile program storage unit from the information processing apparatus and attach again the nonvolatile program storage unit in which an altered second program has been written, to the information processing apparatus during the power-saving mode.

If the program stored by the nonvolatile program storage unit is altered during the power-saving mode, and the mode is shifted from the power-saving mode to the normal power mode, and then from a first power mode to a second power mode, the altered second program is transferred from the nonvolatile program storage unit to the first memory. Thereafter, when the mode is shifted from the power-saving mode to the normal power mode, the altered second program stored in the first memory is transferred to the second memory, and a second calculation unit executes the altered second program stored in the second memory.

SUMMARY

An exemplary embodiment of the present disclosure includes the following configuration. An information processing apparatus includes a power control unit configured to control the information processing apparatus to make a transition to a power-saving state, a first processor configured to confirm that a program stored in the information processing apparatus is authentic, in association with the transition to the power-saving state, and a first volatile memory configured to store the program confirmed to be authentic during the power-saving state.

Further features will become apparent from the following description of exemplary embodiments with reference to the attached drawings.

DESCRIPTION OF THE EMBODIMENTS

Figure 1:
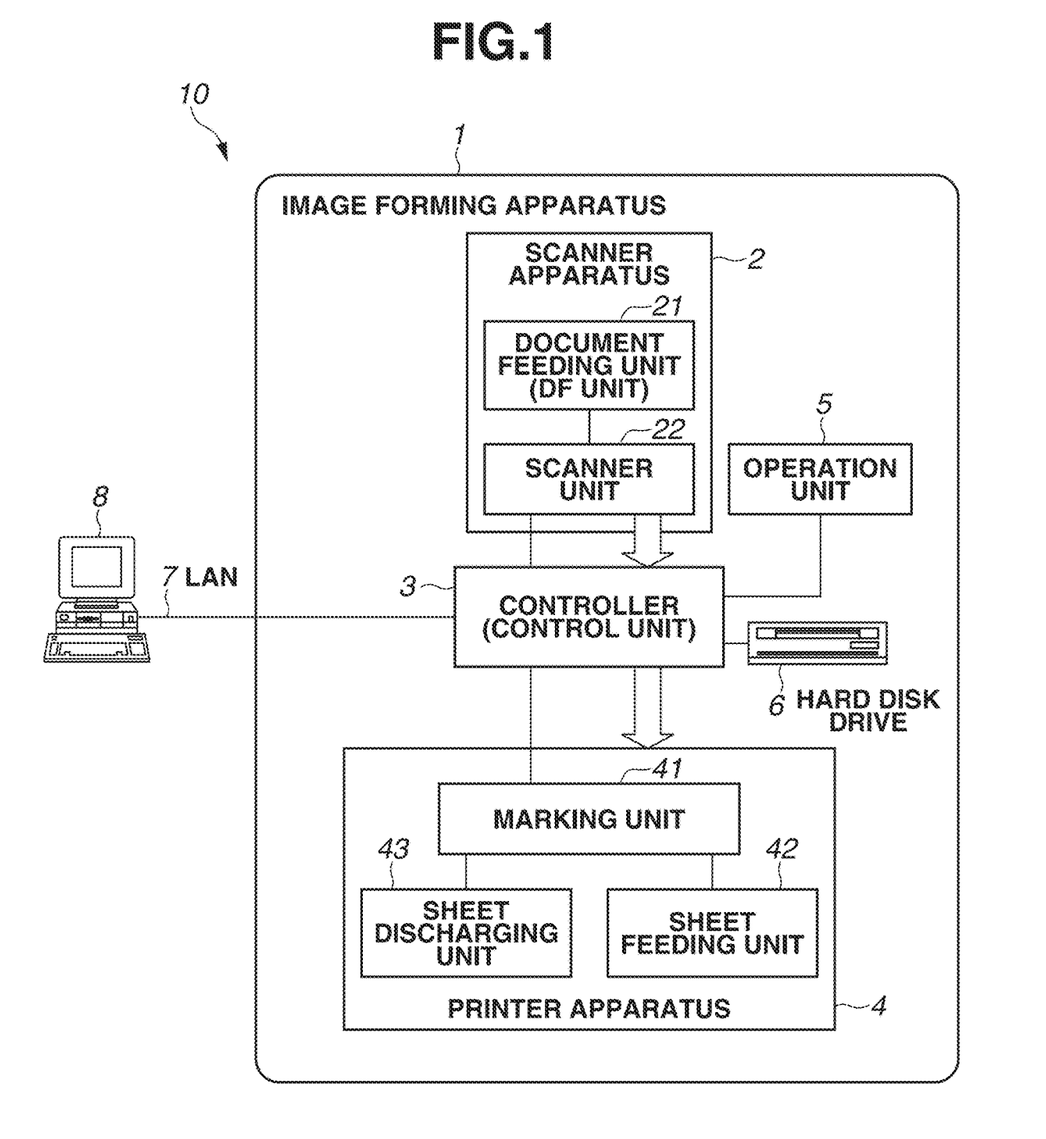
FIG. 1 is a block diagram illustrating a configuration example of an image forming system according to one embodiment.

FIG. 1 is a block diagram illustrating a configuration example of an image forming system 10 according to an exemplary embodiment of the present disclosure. The image forming system 10 is an information processing system, and includes an image forming apparatus 1, a local area network (LAN) 7, and a computer 8. The image forming apparatus 1 is an information processing apparatus, and includes a scanner apparatus 2, a controller 3, a printer apparatus 4, an operation unit 5, and a hard disk drive 6. The scanner apparatus 2 optically reads an image from a document and converts the document into a digital image. The printer apparatus 4 prints the digital image on a paper medium. The operation unit 5 performs operation of the image forming apparatus 1. The hard disk drive 6 is a nonvolatile storage device that stores the digital image, control programs, etc. The controller 3 is a control unit that controls the scanner apparatus 2, the printer apparatus 4, the operation unit 5, and the hard disk drive 6, to execute jobs on the image forming apparatus 1. The image forming apparatus 1 inputs or outputs the digital image to and from the external computer through the LAN 7, to perform issuance of a job, instruction to the apparatus, etc.

The scanner apparatus 2 includes a document feeding unit (DF unit) 21 and a scanner unit 22. The document feeding unit 21 automatically and successively feeds a plurality of documents to the scanner unit 22 one by one. The scanner unit 22 optically scans the document, converts the document into a digital image, and outputs the converted digital image to the controller 3.

The printer apparatus 4 includes a marking unit 41, a sheet feeding unit 42, and a sheet discharging unit 43. The sheet feeding unit 42 successively feeds a plurality of sheets to the marking unit 41 one by one. The marking unit 41 prints the digital image on the fed sheet. The sheet discharging unit 43 discharges the printed sheet.

The operation unit 5 includes an operation button and a display panel such as a liquid crystal display that allows a user to instruct the image forming apparatus 1 to perform operations such as copying of an image, or presents various kinds of information of the image forming apparatus 1 to the user.

Figure 2:
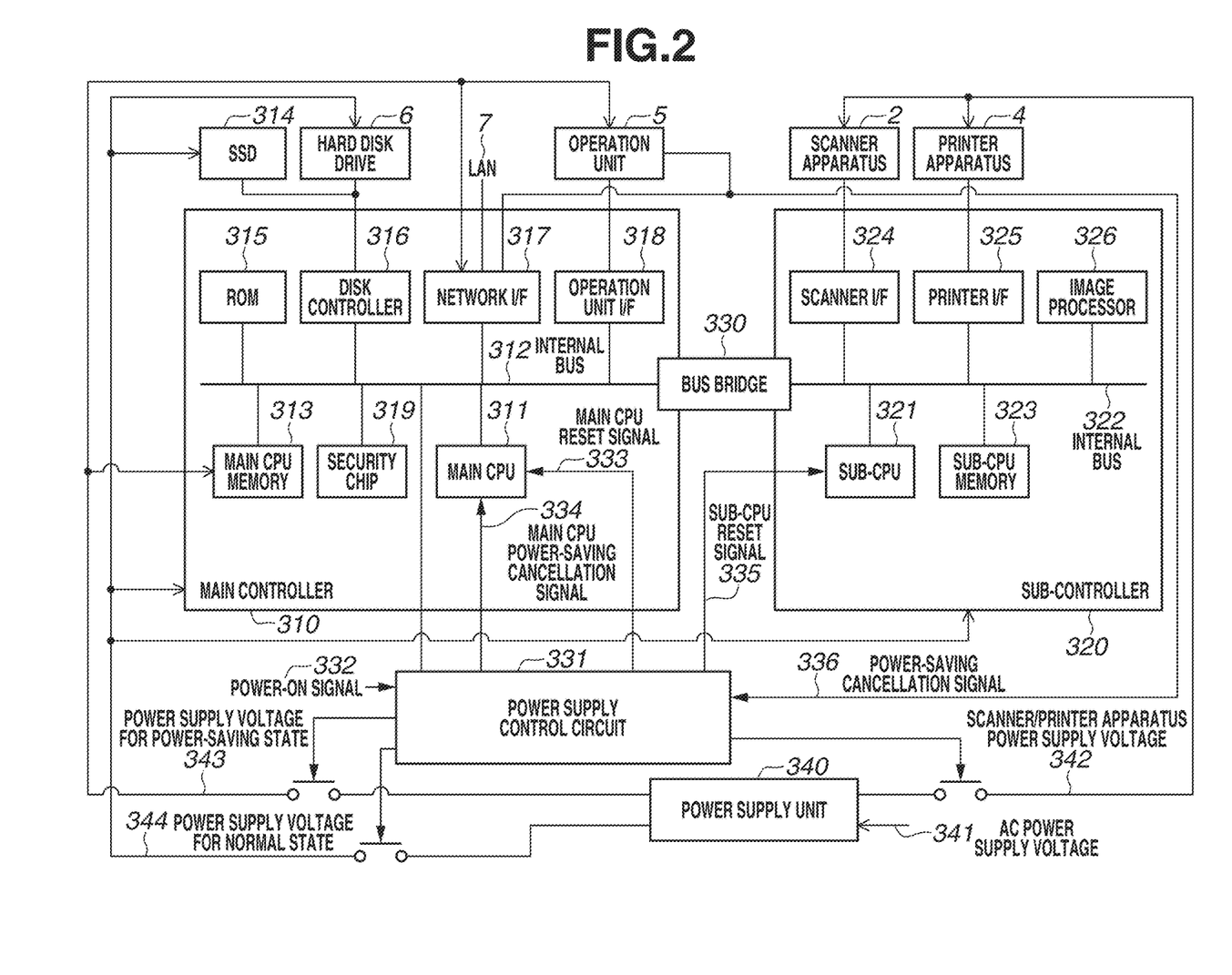
FIG. 2 is a block diagram illustrating a configuration example of a controller according to one embodiment.

FIG. 2 is a block diagram illustrating a configuration example of the controller 3 of FIG. 1. The controller 3 includes a main controller 310, a sub-controller 320, a bus bridge 330, a power supply control circuit 331, a power supply unit 340, and a solid state drive (SSD) 314.

The main controller 310 includes a main central processing unit (CPU) 311, an internal bus 312, a main CPU memory 313, a read-only memory (ROM) 315, a disk controller 316, a network interface 317, an operation unit interface 318, and a security chip 319. The main controller 310 is a general-purpose CPU system. The main CPU 311 is a processing unit that controls the whole of the main controller 310. The main CPU memory 313 is a volatile storage unit used by the main CPU 311. The ROM 315 is a read-only memory. The disk controller 316 controls the hard disk drive 6 and the SSD 314. The network interface 317 is connected to the LAN 7. The operation unit interface 318 is connected to the operation unit 5. The security chip 319 is a check unit that internally holds key information for checking an electronic signature, and includes a function of checking an electronic signature of firmware of the image forming apparatus 1.

The sub-controller 320 includes a sub-CPU 321, an internal bus 322, a sub-CPU memory 323, a scanner interface 324, a printer interface 325, and an image processor 326. The sub-CPU 321 is a processing unit that controls the whole of the sub-controller 320. The sub-CPU memory 323 is a volatile storage unit used by the sub-CPU 321. The scanner interface 324 is connected to the scanner apparatus 2. The printer interface 325 is connected to the printer apparatus 4. The image processor 326 performs real time digital image processing. The bus bridge 330 connects the internal bus 312 of the main controller 310 and the internal bus 322 of the sub-controller 320.

Figure 3:
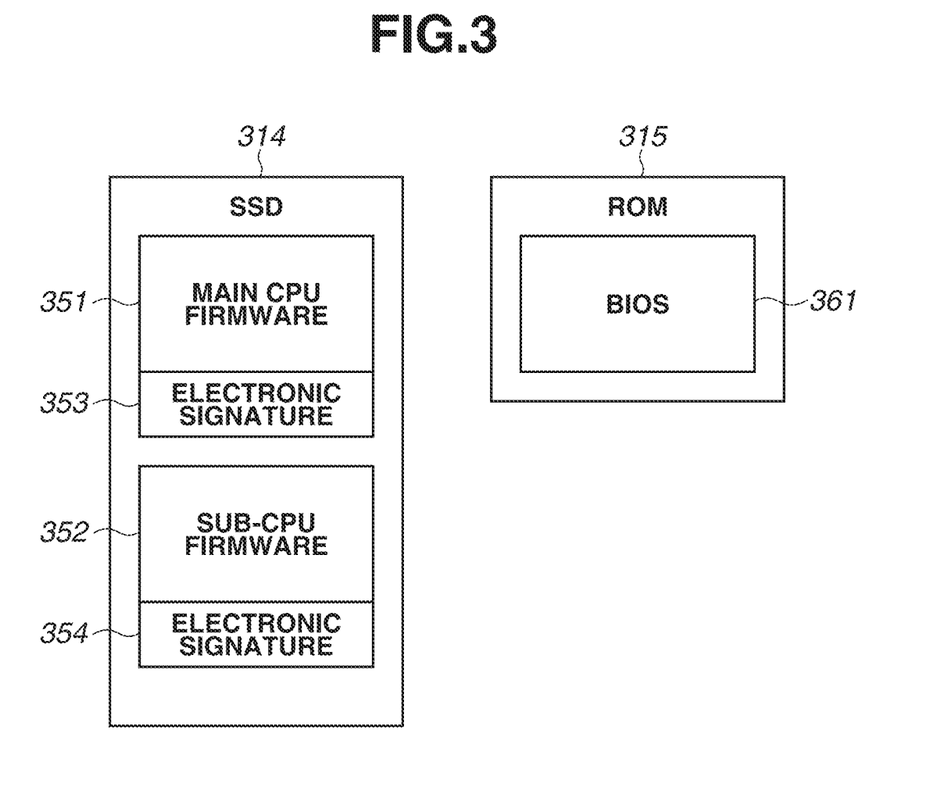
FIG. 3 is a diagram illustrating an arrangement of firmware of an image forming apparatus according to one embodiment.

FIG. 3 is a diagram illustrating stored contents of the SSD 314 and the ROM 315 in FIG. 2. The SSD 314 and the ROM 315 are nonvolatile storage units. The SSD 314 stores main CPU firmware 351, an electronic signature 353, sub-CPU firmware 352, and an electronic signature 354. The main CPU firmware 351 is a program to operate the main controller 310. The main CPU 311 loads the main CPU firmware 351 stored in the SSD 314 into the main CPU memory 313, and executes the main CPU firmware 351 loaded and stored in the main CPU memory 313. The sub-CPU firmware 352 is a program to operate the sub-controller 320, and is developed in the sub-CPU memory 323. The sub-CPU 321 executes the sub-CPU firmware 352 stored in the sub-CPU memory 323.

The electronic signature 353 is information for checking that the main CPU firmware 351 is normal (authentic). The electronic signature 354 is information for checking that the sub-CPU firmware 352 is normal. The security chip 319 checks that the main CPU firmware 351 is normal based on the electronic signature 353, and checks that the sub-CPU firmware 352 is normal based on the electronic signature 354. A state where the firmware is normal (authentic) is, for example, a state where the firmware has not been altered.

The ROM 315 stores a basic input/output system (BIOS) 361. The BIOS 361 is an initial program that is executed first by the main CPU 311 immediately after the image forming apparatus 1 is turned on. The firmware 351 and 352 and the electronic signatures 353 and 354 stored in the SSD 314 are rewritable through firmware update, etc. In contrast, the BIOS 361 held by the ROM 315 is unrewritable.

Each of the main CPU memory 313 and the sub-CPU memory 323 in FIG. 2 is a volatile dynamic random access memory (DRAM), and cannot hold the stored contents while the power of the image forming apparatus is off. Therefore, the main CPU firmware 351 and the sub-CPU firmware 352 are stored in the nonvolatile SSD 314. When the image forming apparatus 1 is turned on, the main CPU firmware 351 is loaded from the SSD 314 into the main CPU memory 313, and the sub-CPU firmware 352 is loaded from the SSD 314 into the sub-CPU memory 323. The main CPU 311 executes the main CPU firmware 351 loaded into the main CPU memory 313. The sub-CPU 321 executes the sub-CPU firmware 352 loaded into the sub-CPU memory 323.

Figure 4A:
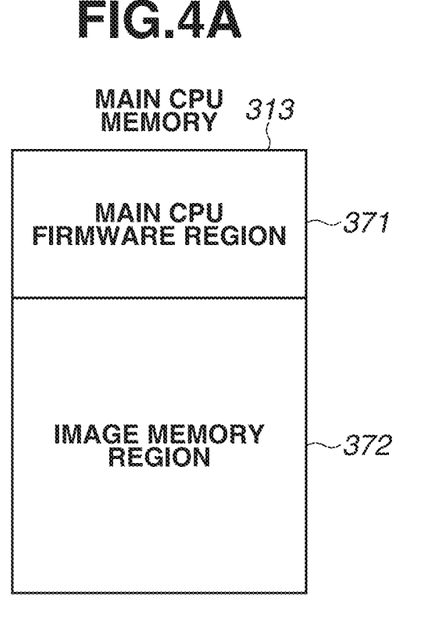
FIGS. 4A and 4B are diagrams each illustrating a configuration example of a memory of the image forming apparatus according to one embodiment.

FIG. 4A is a diagram illustrating a region of the main CPU memory 313. The main CPU memory 313 includes a main CPU firmware region 371 and an image memory region 372. The main CPU firmware region 371 is a region for storing the main CPU firmware 351 loaded from the SSD 314. The main CPU 311 executes the main CPU firmware 351 in the main CPU firmware region 371. The image memory region 372 is a region for temporarily storing the image data during job execution.

Figure 4B:
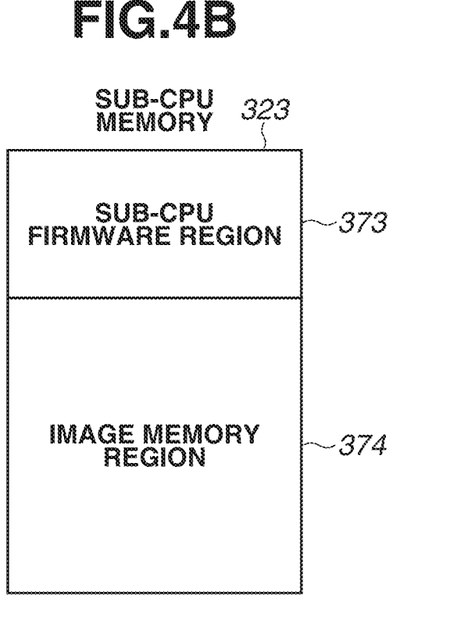

FIG. 4B is a diagram illustrating a region of the sub-CPU memory 323. The sub-CPU memory 323 includes a sub-CPU firmware region 373 and an image memory region 374. The sub-CPU firmware region 373 is a region for storing the sub-CPU firmware 352 loaded from the SSD 314. The sub-CPU 321 executes the sub-CPU firmware 352 in the sub-CPU firmware region 373. The image memory region 374 is a region for temporarily storing the image data during job execution.

In FIG. 2, the power supply control circuit 331 is an electric circuit for controlling a power state of the image forming apparatus 1. The power supply unit 340 generates a scanner/printer apparatus power supply voltage 342, a power supply voltage 343 for power-saving state, and a power supply voltage 344 for normal state for the units of the image forming apparatus 1 based on an alternating-current (AC) power supply voltage 341. The scanner/printer apparatus power supply voltage 342 is supplied to the scanner apparatus 2 and the printer apparatus 4 through switch control of the power supply control circuit 331. The power supply voltage 343 for power-saving state is supplied to the main CPU memory 313, the network interface 317, and the operation unit 5 through the switch control of the power supply control circuit 331. The power supply voltage 344 for normal state is supplied to the main controller 310, the sub-controller 320, the SSD 314, and the hard disk drive 6 through the switch control of the power supply control circuit 331. In FIG. 2, a line with an arrow extended from the power supply control circuit 331 indicates a signal line, and a line with an arrow extended from the power supply unit 340 indicates a power supply line. In FIG. 2, the power supply line and the signal line are distinguished by shapes of the respective arrows.

The scanner/printer apparatus power supply voltage 342 is a power supply voltage supplied to the scanner apparatus 2 and the printer apparatus 4. The power supply voltage 343 for power-saving state is a power supply voltage supplied to devices where energization is maintained while the image forming apparatus 1 is in the power-saving state. The power supply voltage 344 for normal state is a power supply voltage supplied to devices energized in a case where the image forming apparatus 1 is in the normal state. The power supply voltage 344 for normal state is not supplied in the case where the image forming apparatus 1 is in the power-saving state. The energized/non-energized states with the power supply voltages are individually controlled by the power supply control circuit 331.

A power-on signal 332 is a signal to instruct the power supply control circuit 331 to become turned on when the power of the image forming apparatus 1 is off. The power-on signal 332 is input when the user operates a power switch inside the operation unit 5. A main CPU reset signal 333 is a signal to control a reset state of the main CPU 311. When the power supply control circuit 331 stops output of the main CPU reset signal 333 in response to power-on of the image forming apparatus 1, the reset state of the main CPU 311 is canceled and the main CPU 311 starts operation. A main CPU power-saving cancellation signal 334 is a signal output by the power supply control circuit 331 to cancel the power-saving state of the main CPU 311 in the case where the main CPU 311 is in the power-saving state.

A sub-CPU reset signal 335 is a signal to control a reset state of the sub-CPU 321. When the power supply control circuit 331 stops output of the sub-CPU reset signal 335, the reset state of the sub-CPU 321 is canceled and the sub-CPU 321 starts operation. The power supply control circuit 331 is connected to the internal bus 312 of the main controller 310, and the main CPU 311 instructs the power supply control circuit 331 to control the state of the sub-CPU reset signal 335.

A power-saving cancellation signal 336 is a signal to instruct cancellation of the power-saving state when the image forming apparatus 1 is in the power-saving state. When the power-saving cancellation signal 336 is input to the power supply control circuit 331, the controller 3 starts returning operation from the power-saving state to the normal state. The power-saving cancellation signal 336 is input to the power supply control circuit 331 in response to operation of the operation unit 5 or packet reception by the network interface 317. More specifically, in a case where the user operates the switch in the operation unit 5, the operation unit 5 outputs the power-saving cancellation signal 336. In addition, the network interface 317 outputs the power-saving cancellation signal 336 when detecting reception of a network packet from the LAN 7.

Next, operation of the controller 3 is described with printing operation using a paper medium as an example. When the network interface 317 receives a print job from the LAN 7, the main CPU 311 stores the digital image data received through the network interface 317, in the image memory region 372 in the main CPU memory 313. When it is confirmed that a certain amount or all of the digital image data is stored in the image memory region 372, the main CPU 311 transfers the digital image data to the image memory region 374 in the sub-CPU memory 323. Thereafter, the main CPU 311 instructs the sub-CPU 321 to start printing operation.

The sub-CPU 321 controls the printer apparatus 4 by outputting an image output instruction to the printer apparatus 4 through the printer interface 325. The sub-CPU 321 teaches the image processor 326 a location of the image data in the image memory region 374, and outputs the image data to the printer apparatus 4 through the image processor 326 and the printer interface 325, according to a synchronization signal from the printer apparatus 4. The printer apparatus accordingly prints the digital image data on the paper medium. The sub-CPU 321 also controls the scanner apparatus 2 in a similar manner.

Figure 5A:
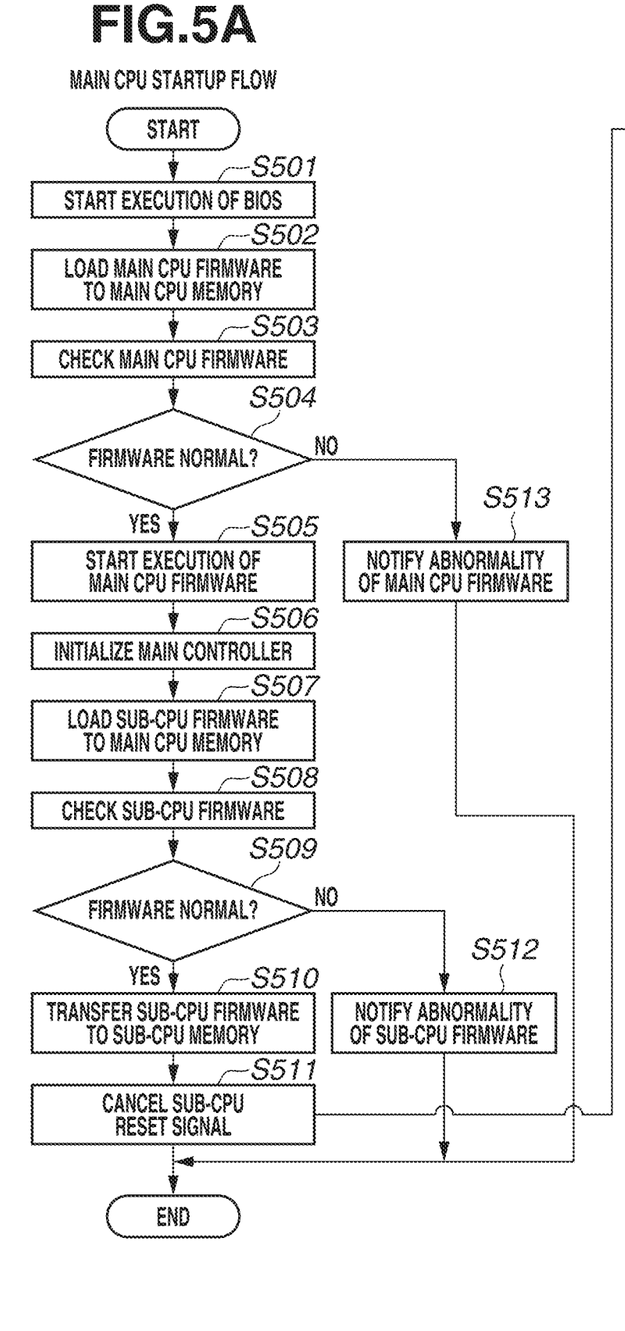
FIGS. 5A and 5B are flowcharts illustrating startup operation of the image forming apparatus according to one embodiment.
Figure 5B:
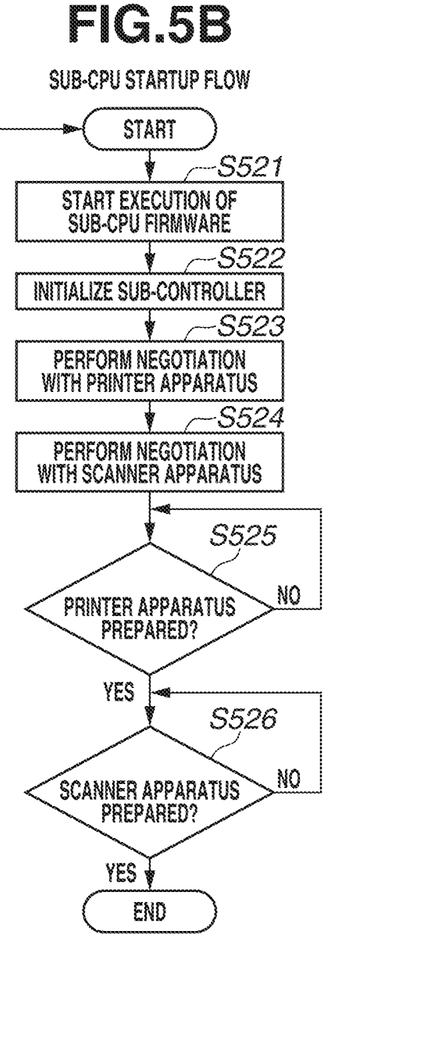

FIGS. 5A and 5B are flowcharts illustrating a method for controlling startup processing of the image forming apparatus 1. FIG. 5A is a flowchart illustrating processing executed by the main CPU 311 at the startup of the image forming apparatus 1. When the power-on signal 332 is provided, the power supply control circuit 331 starts supply of the power supply voltages to the units in the image forming apparatus 1. More specifically, the power supply control circuit 331 puts, into a supplied state, all of the scanner/printer apparatus power supply voltage 342, the power supply voltage 343 for power-saving state, and the power supply voltage 344 for normal state. When the power supply control circuit 331 controls the main CPU reset signal 333 to cancel the reset state of the main CPU 311, the main CPU 311 starts operating and executes the processing of FIG. 5A. At this time, the sub-CPU 321 still remains in the reset state, and the power supply control circuit 331 controls the sub-CPU 321 not to start operation.

In step S501, the main CPU 311 starts execution of the BIOS 361 that is the initial program stored in the ROM 315. Since the BIOS 361 is stored in the unrewritable ROM 315, the BIOS 361 is not rewritten to an unauthorized program.

Next, in step S502, the main CPU 311 executes the BIOS 361 to initialize the disk controller 316. Thereafter, the main CPU 311 controls the SSD 314 to load the main CPU firmware 351 from the SSD 314 to the main CPU firmware region 371 in the main CPU memory 313. The main CPU memory 313 stores the main CPU firmware 351 in the main CPU firmware region 371.

In step S503 after loading is completed, the main CPU 311 checks whether the main CPU firmware 351 in the main CPU firmware region 371 is normal (authentic). More specifically, the main CPU 311 checks the main CPU firmware 351 based on the electronic signature 353 using an electronic signature check function of the security chip 319.

Next, in step S504, the main CPU 311 determines whether the main CPU firmware 351 is normal, based on a result of the electronic signature check of the main CPU firmware 351. In a case where the main CPU 311 determines that the main CPU firmware 351 is normal (YES in step S504), the processing proceeds to step S505. In a case where the main CPU 311 determines that the main CPU firmware 351 is not normal (NO in step S504), the processing proceeds to step S513.

In step S505, the main CPU 311 starts execution of the main CPU firmware 351 stored in the main CPU firmware region 371. Next, in step S506, the main CPU 311 executes the main CPU firmware 351 to initialize peripheral devices of the main controller 310. More specifically, the main CPU 311 initializes the network interface 317 and the operation unit interface 318.

Next, in step S507, the main CPU 311 controls the SSD 314 through the disk controller 316, and loads the sub-CPU firmware 352 from the SSD 314 into the image memory region 372 in the main CPU memory 313. The image memory region 372 is not used except for the case where the image forming apparatus 1 is executing a job. Therefore, the image memory region 372 is used as a temporal storage of the sub-CPU firmware 352.

In step S508 after loading is completed, the main CPU 311 checks whether the sub-CPU firmware 352 in the image memory region 372 is normal. More specifically, the main CPU 311 checks the sub-CPU firmware 352 based on the electronic signature 354 using the electronic signature check function of the security chip 319.

Next, in step S509, the main CPU 311 determines whether the sub-CPU firmware 352 is normal, based on a result of the electronic signature check of the sub-CPU firmware 352. In a case where the main CPU 311 determines that the sub-CPU firmware 352 is normal (YES in step S509), the processing proceeds to step S510. In a case where the main CPU 311 determines that the sub-CPU firmware 352 is not normal (NO in step S509), the processing proceeds to step S512.

In step S510, the main CPU 311 transfers the sub-CPU firmware 352 from the image memory region 372 in the main CPU memory 313 to the sub-CPU firmware region 373 in the sub-CPU memory 323. The sub-CPU memory 323 stores the sub-CPU firmware 352 in the sub-CPU firmware region 373. Next, in step S511, the main CPU 311 controls the sub-CPU reset signal 335 through the power supply control circuit 331 to cancel the reset state of the sub-CPU 321. As a result, the sub-CPU 321 starts the processing of FIG. 5B.

Figure 8A:
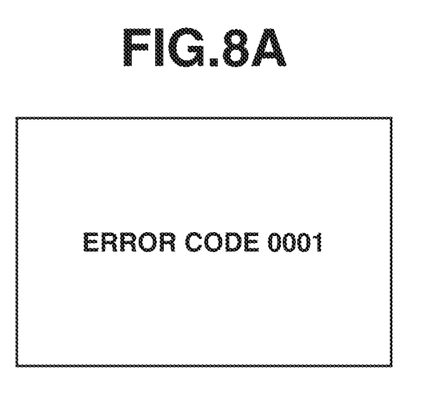
FIGS. 8A and 8B are diagrams each illustrating an example screen displayed when firmware abnormality is detected according to one embodiment.

In step S513, the main CPU 311 displays, on the operation unit 5, a screen notifying that the main CPU firmware 351 is not normal. More specifically, as illustrated in FIG. 8A, the main CPU 311 displays, on the screen of the operation unit 5, for example, an error code indicating that the main CPU firmware 351 is abnormal. FIG. 8A illustrates an example screen notifying abnormality. The main CPU 311 then interrupts the startup processing of the image forming apparatus 1.

Figure 8B:
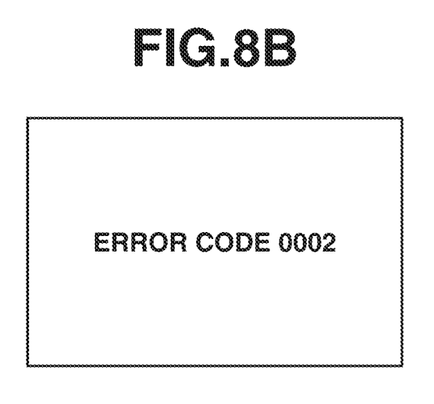

In step S512, the main CPU 311 displays, on the operation unit 5, a screen notifying that the sub-CPU firmware 352 is not normal. More specifically, as illustrated in FIG. 8B, the main CPU 311 displays, on the screen of the operation unit 5, for example, an error code indicating that the sub-CPU firmware 352 is abnormal. FIG. 8B illustrates an example screen notifying abnormality. The main CPU 311 then interrupts the startup processing of the image forming apparatus 1.

FIG. 5B is a flowchart illustrating the processing executed by the sub-CPU 321 at the startup of the image forming apparatus 1. When the reset state of the sub-CPU 321 is canceled in step S511 of FIG. 5A, the sub-CPU 321 starts execution of the processing of FIG. 5B.

In step S521, the sub-CPU 321 starts execution of the sub-CPU firmware 352 stored in the sub-CPU firmware region 373. As described above, the sub-CPU firmware 352 has been previously determined to be normal by the main CPU 311.

Next, in step S522, the sub-CPU 321 initializes the peripheral devices in the sub-controller 320. More specifically, the sub-CPU 321 initializes the scanner interface 324, the printer interface 325, and the image processor 326.

Next, in step S523, the sub-CPU 321 performs negotiation with the printer apparatus 4 through the printer interface 325. Next, in step S524, the sub-CPU 321 performs negotiation with the scanner apparatus 2 through the scanner interface 324.

Next, in step S525, the sub-CPU 321 determines whether preparation for job execution of the printer apparatus 4 has been completed. After the negotiation in step S523, the printer apparatus 4 performs various kinds of adjusting operation, and it is necessary for the sub-CPU 321 to wait for completion of the adjusting operation for job execution. The sub-CPU 321 can know, through the printer interface 325, whether the preparation of the printer apparatus 4 has been completed. Therefore, the sub-CPU 321 repeats the process in step S525 until the preparation of the printer 4 is completed. In a case where the sub-CPU 321 determines that the preparation of the printer apparatus 4 has been completed (YES in step S525), the processing proceeds to step S526.

In step S526, the sub-CPU 321 determines whether preparation for job execution of the scanner apparatus 2 has been completed, in a similar manner. The sub-CPU 321 repeats the process in step S526 until the preparation of the scanner apparatus 2 is completed. In a case where the sub-CPU 321 determines that the preparation of the scanner apparatus 2 has been completed (YES in step S526), the startup processing of the image forming apparatus 1 is ended.

At the startup of the image forming apparatus 1, the main CPU 311 checks the electronic signature 353 of the main CPU firmware 351 and the electronic signature 354 of the sub-CPU firmware 352. The sub-CPU 321 executes the startup processing of FIG. 5B only in the case where the main CPU 311 determines that the electronic signature 353 and the electronic signature 354 are normal. This makes it possible to ensure that the main CPU 311 and the sub-CPU 321 do not execute unauthorized firmware at the startup of the image forming apparatus 1, and to secure safety.

In the present exemplary embodiment, the checking of whether the main CPU firmware 351 and the sub-CPU firmware 352 are authorized is performed using the electronic signature technology; however, the configuration is an example. Hash values of the main CPU firmware 351 and the sub-CPU firmware 352 may be previously stored in a nonvolatile storage medium, rewriting of which is difficult. In this case, the checking may be performed by, for example, a method for comparing the stored hash values of the main CPU firmware 351 and the sub-CPU firmware 352 calculated at the startup with each other.

Figure 6:
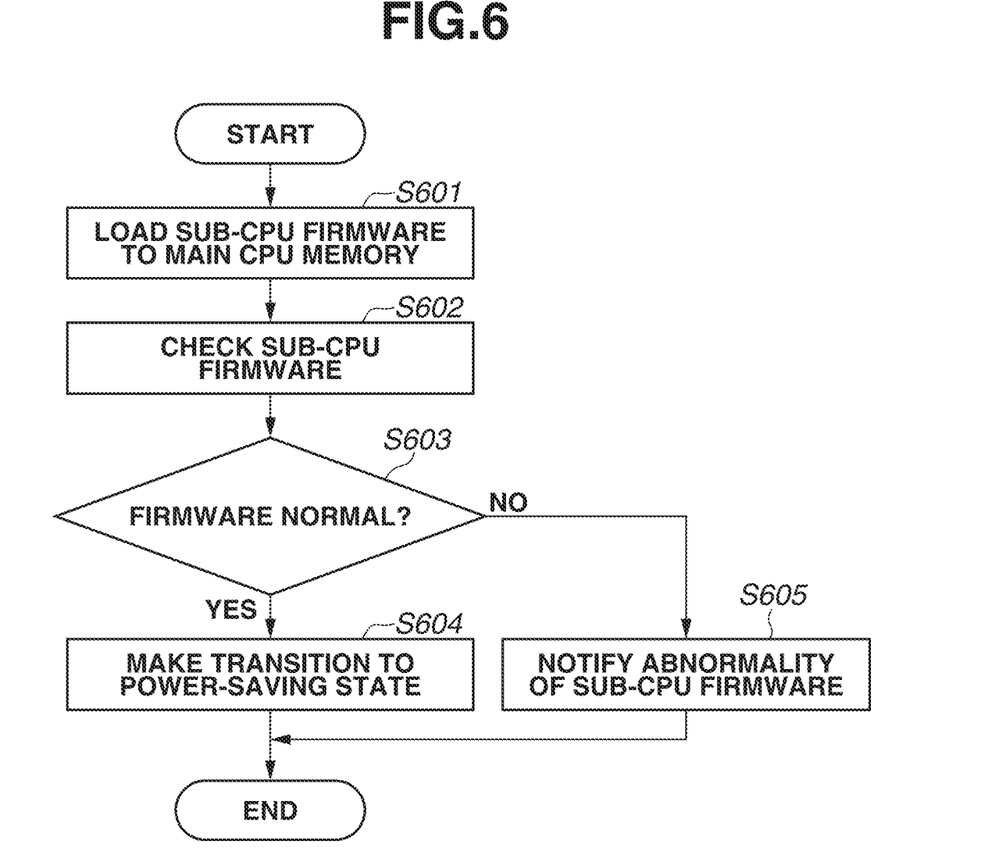
FIG. 6 is a flowchart illustrating transition operation to a power-saving state of the image forming apparatus according to one embodiment.

FIG. 6 is a flowchart indicating processing executed by the main CPU 311 when the image forming apparatus 1 makes a transition from the normal state (first power mode) to the power-saving state (second power mode). In a case where a condition for transitioning from the normal state to the power-saving state is satisfied, the image forming apparatus 1 executes the processing of FIG. 6. For example, in a case where no job is executed for a predetermined time or more, the image forming apparatus 1 executes the processing of FIG. 6. The image forming apparatus 1 makes a transition from the normal state to the power-saving state to save power.

First, in step S601, the main CPU 311 controls the SSD 314 through the disk controller 316, and loads the sub-CPU firmware 352 from the SSD 314 to the image memory region 372 in the main CPU memory 313. The sub-CPU firmware 352 is used when the image forming apparatus 1 is returned from the power-saving state to the normal state afterward. When the main CPU 311 executes the transition processing to the power-saving state, the image memory region 372 is not used because the image forming apparatus 1 does not execute a job, and is accordingly used as a temporal storage of the sub-CPU firmware 352.

In step S602 after loading is completed, the main CPU 311 checks whether the sub-CPU firmware 352 in the image memory region 372 is normal (authentic). More specifically, the main CPU 311 checks the sub-CPU firmware 352 based on the electronic signature 354 using the electronic signature check function of the security chip 319.

Next, in step S603, the main CPU 311 determines whether the sub-CPU firmware 352 is normal, based on a result of the electronic signature checking of the sub-CPU firmware 352. In a case where the main CPU 311 determines that the sub-CPU firmware 352 is normal (YES in step S603), the processing proceeds to step S604. In a case where the main CPU 311 determines that the sub-CPU firmware 352 is not normal (NO in step S603), the processing proceeds to step S605. The case where the main CPU 311 determines that the sub-CPU firmware 352 is normal corresponds to a case where the main CPU 311 confirms that the sub-CPU firmware 352 is authentic.

In step S604, the main CPU 311 controls the power supply control circuit 331 to cause the image forming apparatus 1 to make a transition to the power-saving state. The power supply control circuit 331 stops supply of the scanner/printer apparatus power supply voltage 342 and the power supply voltage 344 for normal state, and maintains supply of the power supply voltage 343 for power-saving state. As a result, the image forming apparatus 1 transitions to the power-saving state.

Figure 9:
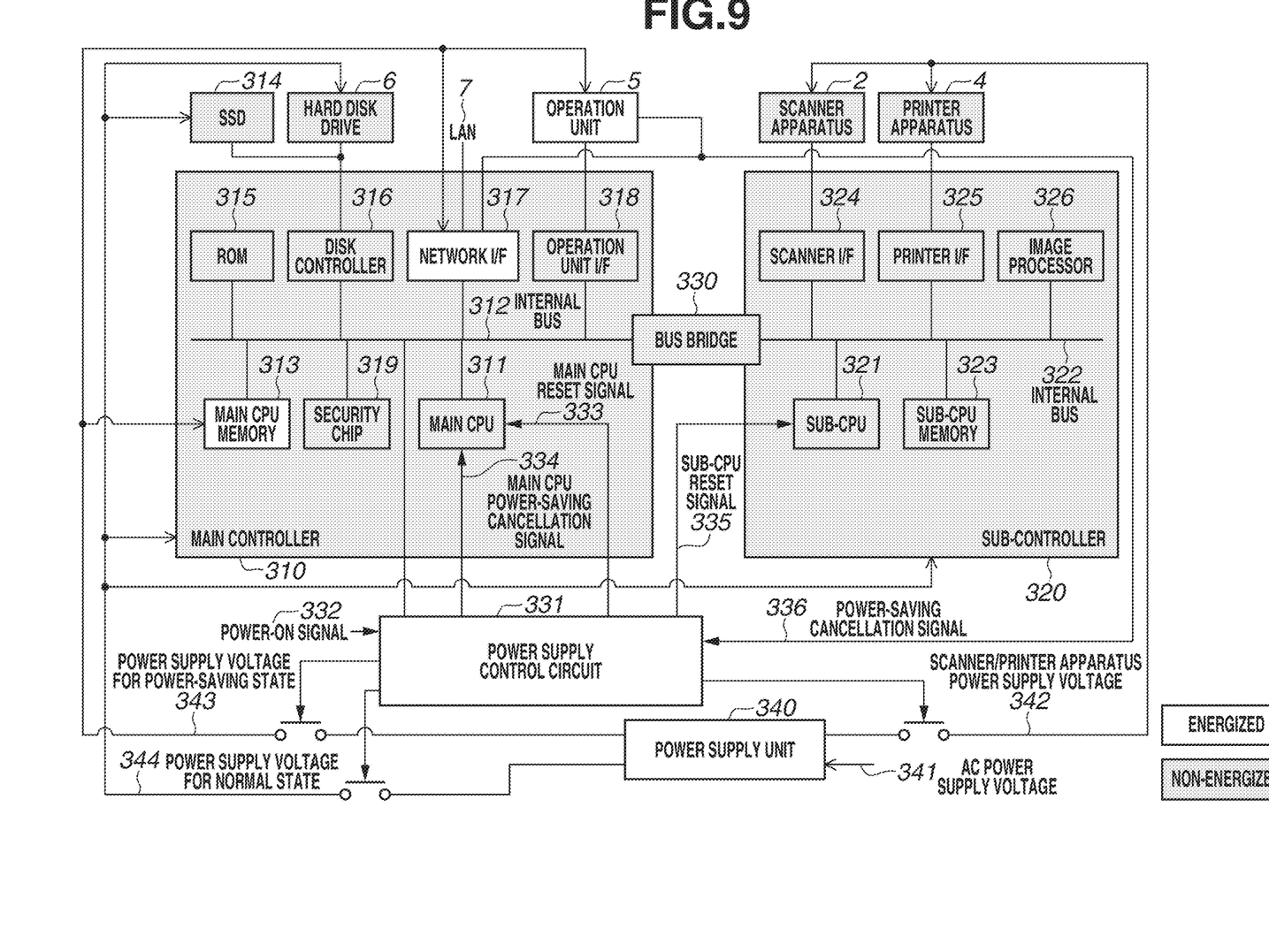
FIG. 9 is a diagram illustrating an energized state of the image forming apparatus in the power-saving state according to one embodiment.

FIG. 9 is a diagram illustrating an energized state of each of the units of the image forming apparatus 1 in the power-saving state. The power supply control circuit 331 supplies the power supply voltage 343 for power-saving state to the main CPU memory 313, the network interface 317, and the operation unit 5. In contrast, the power supply control circuit 331 does not supply the power supply voltage 343 for power-saving state to the main CPU 311, the sub-CPU 321, the sub-CPU memory 323, the SSD 314, etc. The main CPU memory 313, the network interface 317, the operation unit 5, the power supply control circuit 331, and the power supply unit 340 are in the energized state. Other units are in a non-energized state. The main CPU memory 313 is maintained in the energized state and holds the sub-CPU firmware 352 in the image memory region 372 while the image forming apparatus 1 is in the power-saving state. In such a manner, in the power-saving state, the energization of the hard disk drive 6 and the sub-CPU memory 323 is stopped, and the energization of the main CPU memory 313 is not stopped.

In step S605 of FIG. 6, the main CPU 311 displays, on the operation unit 5, the screen notifying that the sub-CPU firmware 352 is not normal, as illustrated in FIG. 8B. The main CPU 311 then interrupts the transition processing for the image forming apparatus 1 to transition to the power-saving state.

The image forming apparatus 1 makes a transition from the normal state to the power-saving state through the processing of FIG. 6. In a case where the sub-CPU firmware 352 of the SSD 314 is not normal, the main CPU 311 cancels the transition to the power-saving state. This makes it possible to prevent the unauthorized sub-CPU firmware 352 from being executed by the sub-CPU 321 when the image forming apparatus 1 returns from the power-saving state to the normal state.

Figure 7A:
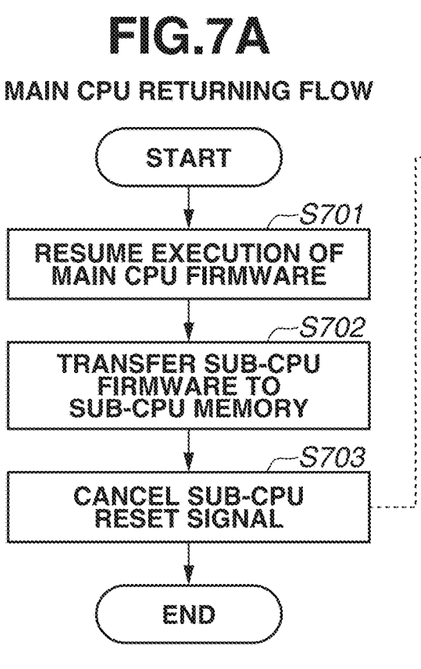
FIGS. 7A and 7B are flowcharts illustrating returning operation to a normal state of the image forming apparatus according to one embodiment.
Figure 7B:
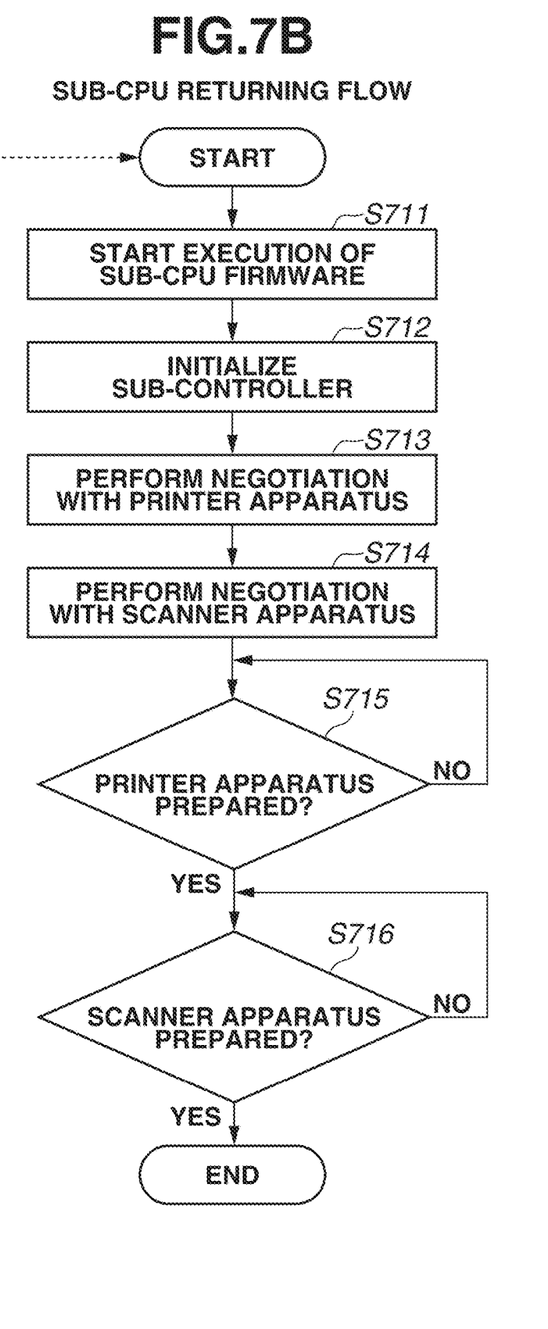

FIGS. 7A and 7B are flowcharts illustrating processing when the image forming apparatus 1 returns from the power-saving state to the normal state. FIG. 7A is a flowchart illustrating the returning processing for the main CPU 311 to return the normal state. In a case where a transition condition for transitioning from the power-saving state to the normal state is satisfied, the image forming apparatus 1 executes the processing of FIGS. 7A and 7B. For example, in a case where the user operates the operation unit 5 or in a case where the network interface 317 receives a packet (signal), the power supply control circuit 331 receives the power-saving cancellation signal 336. The power supply control circuit 331 then supplies the scanner/printer apparatus power supply voltage 342 and the power supply voltage 344 for normal state to the units of the image forming apparatus 1, outputs the main CPU power-saving cancellation signal 334 to the main CPU 311, thereby resuming the operation of the main CPU 311. More specifically, the power supply control circuit 331 supplies the power supply voltage 344 for normal state to the main CPU 311, the main CPU memory 313, the sub-CPU 321, the sub-CPU memory 323, the SSD 314, etc. The CPU 311, after resuming the operation, executes the processing of FIG. 7A.

In step S701, the main CPU 311 resumes execution of the main CPU firmware 351 in the main CPU firmware region 371. The main CPU memory 313 is energized and holds the stored contents while the image forming apparatus is in the power-saving state. The main CPU firmware 351, here, resumes execution the main CPU 311 that has been checked in step S503 of FIG. 5A at the startup of the image forming apparatus 1.

Next, in step S702, the main CPU 311 transfers the sub-CPU firmware 352 in the image memory region 372 to the sub-CPU firmware region 373 in the sub-CPU memory 323. The Sub-CPU memory 323 has lost the stored contents because the energization of the sub-CPU memory 323 is stopped while the image forming apparatus 1 is in the power-saving state. Therefore, to bring the sub-controller 320 into an operating state again, it is necessary for the main CPU 311 to transfer the sub-CPU firmware 352 to the sub-CPU memory 323. Here, the main CPU 311 transfers the sub-CPU firmware 352 that has been checked in step S602 of FIG. 6 at the transition to the power-saving state.

The main CPU 311 may load the sub-CPU firmware 352 from the SSD 314 to the main CPU memory 313 and transfer the sub-CPU firmware 352 from the main CPU memory 313 to the sub-CPU memory 323 at the time of returning to the normal state. In this case, however, it takes a long time for the image forming apparatus 1 to return from the power-saving state to the normal state.

According to the present exemplary embodiment, the main CPU 313 loads the sub-CPU firmware 352 from the SSD 314 to the main CPU memory 313 at the transition to the power-saving state in FIG. 6. In addition, the main CPU 311 transfers the sub-CPU firmware 352 from the main CPU memory 313 to the sub-CPU memory 323 at the time of returning to the normal state in FIG. 7A. This allows a reduction in the returning time taken for the image forming apparatus 1 to return from the power-saving state to the normal state.

Next, in step S703, the main CPU 311 controls the sub-CPU reset signal 335 through the power supply control circuit 331 to cancel the reset state of the sub-CPU 321. As a result, the sub-CPU 321 starts the processing of FIG. 7B.

FIG. 7B is a flowchart illustrating the processing executed by the sub-CPU 321 at the time of returning from the power-saving state to the normal state. The sub-CPU 321 of which the reset state has been canceled in step S703 of FIG. 7A starts execution of the processing of FIG. 7B. The sub-CPU 321 performs processes in steps S711 to S716. The processes in steps S711 to S716 are the same as the processes in steps S521 to S526 of FIG. 5B, and therefore the description thereof is omitted. The image forming apparatus 1 returns from the power-saving state to the normal state through the processing of FIGS. 7A and 7B.

As described above, the sub-CPU 321 can execute the sub-CPU firmware 352 that has been confirmed to be not unauthorized firmware through the checking, at the time when the image forming apparatus 1 returns from the power-saving state to the normal state. This allows the sub-CPU 321 to prevent from executing unauthorized sub-CPU firmware 352 not only when the image forming apparatus 1 is started up but also when the image forming apparatus 1 returns from the power-saving state to the normal state. As a result, it is possible to improve security of the image forming apparatus 1.

Further, the main CPU 311 previously checks on the sub-CPU firmware 352 at the transition to the power-saving state, which allows the main CPU 311 to prevent execution of the unauthorized sub-CPU firmware 352, thereby reducing a time necessary for returning from the power-saving state to the normal state. Since it does not deteriorate the convenience of the image forming apparatus 1 in returning from the power-saving state to the normal state is not deteriorated, it makes it possible to achieve both of security and convenience of the image forming apparatus 1 thereby. Moreover, the power supply control circuit 331 stops supply of the power supply voltage to the sub-controller 320 to reduce power consumption in the power-saving state.

In the present exemplary embodiment, the case where the main CPU firmware 531 and the sub-CPU firmware 352 are stored in the SSD 314 has been described as an example; however, the configuration is not limited thereto, and the main CPU firmware 531 and the sub-CPU firmware 352 may be stored in other nonvolatile storage medium such as the hard disk drive 6. Further, the main CPU firmware 531 and the sub-CPU firmware 352 may be stored in different nonvolatile storage media.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above-described exemplary embodiment merely illustrates an example for embodying the present invention, and the above-described exemplary embodiment does not intend to limit interpretation of the technical scope of the present invention. In other words, the present invention may be implemented in various forms without departing from the technical idea or the main features of the present invention.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-139143, filed Jul. 18, 2017, which is hereby incorporated by reference herein in its entirety.

What is claimed is:

1. An information processing apparatus comprising:
a first bus;
a storage configured to be connected to the first bus and store a program;
a first processor configured to be connected to the first bus and confirm that the program stored in the storage is authentic;
a first volatile memory configured to store the program that is confirmed to be authentic;
a second bus;
a second volatile memory configured be connected to the second bus and the store a program;
a second processor configured to be connected to the second bus and execute the program stored in the second volatile memory; and
a bus bridge configured to connect the first bus and the second bus, receive the program that is confirmed to be authentic by the first processor from the first bus and transfer the received program to the second bus,
wherein the first processor confirms that the program stored in the storage is authentic based on transition of a power state of the information processing apparatus from a first power state in which power is supplied to the second volatile memory to a second power state in which power is not supplied to the second volatile memory, stores the program that is confirmed to be authentic in the first volatile memory, and transmits the program that is stored in the first volatile memory and confirmed to be authentic to the second volatile memory via the bus bridge based on transition of the power state of the information processing apparatus from the second power state to the first power state; and
wherein the second processor executes the program that is stored in the second volatile memory and confirmed to be authentic.

2. The information processing apparatus according to claim 1, wherein the first processor confirms that the program stored in the storage is authentic, before the power state of the information processing apparatus is shifted to the second power state.

3. The information processing apparatus according to claim 1, wherein the first processor confirms that the program is authentic, in response to occurrence of an event that causes the power state of the information processing apparatus to be shifted to the second power state.

4. The information processing apparatus according to claim 1, wherein the first processor confirms that the program stored in the storage is authentic, based on an electronic signature or a hash value.

5. The information processing apparatus according to claim 1, further comprising:
a third processor configured to be connected to the first bus, wherein the first processor is configured to confirm that another program stored in the storage is authentic, and the third processor executes the another program that is confirmed to be authentic.

6. The information processing apparatus according to claim 1, wherein the first processor is configured to notify an abnormality in a case where the program is not authentic.

7. The information processing apparatus according to claim 1, further comprising a printer apparatus or a scanner apparatus.

8. The information processing apparatus according to claim 1, further comprising:
a power controller configured to shift the power state of the information processing apparatus to the second power state based on a condition that the information processing apparatus has executed no jobs for a predetermined time or more.

9. The information processing apparatus according to claim 8, wherein the power controller shifts the power state of the information processing apparatus from the second power state to the first power state based on a condition that an operation unit is operated or an interface receives a signal.

10. A method for controlling an information processing apparatus, the method comprising:
storing a program in a storage;
confirming that the program stored in the storage is authentic by a first processor;
storing the program that is confirmed to be authentic in a first volatile memory;
storing a program in a second volatile memory;
executing the program stored in the second volatile memory by a second processor;
wherein the first processor confirms that the program stored in the storage is authentic based on transition of a power state of the information processing apparatus from a first power state in which power is supplied to the second volatile memory to a second power state in which power is not supplied to the second volatile memory, stores the program that is confirmed to be authentic in the first volatile memory, and transmits the program that is stored in the first volatile memory and confirmed to be authentic to the second volatile memory via a bus bridge based on transition of the power state of the information processing apparatus from the second power state to the first power state, and
wherein the program stored in the second volatile memory is confirmed to be authentic.

11. The information processing apparatus according to claim 1, further comprising a power controller configured to control the power state of the information processing apparatus.

* * * * *